(12) United States Patent  
Walters et al.

(10) Patent No.: US 8,750,460 B2  
(45) Date of Patent: Jun. 10, 2014

(54) SYSTEM AND METHOD FOR REMOTE TESTING OF A SUBSCRIBER LOOP

(75) Inventors: Robert Walters, Overland Park, KS (US); Steven M. Jensen, Kansas City, MO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1052 days.

(21) Appl. No.: 12/110,545

(22) Filed: Apr. 28, 2008

(65) Prior Publication Data

US 2009/0268878 A1 Oct. 29, 2009

(51) Int. Cl.
*H04M 1/24* (2006.01)
*H04M 3/08* (2006.01)
*H04M 3/22* (2006.01)
*H04M 3/30* (2006.01)

(52) U.S. Cl.
CPC ............................... *H04M 3/30* (2013.01)
USPC .................. 379/27.01; 379/29.01; 379/26.01

(58) Field of Classification Search
CPC ........................................................ H04M 3/30
USPC ...................... 379/29.01, 26.01, 27.01, 27.04
See application file for complete search history.

(56) References Cited

U.S. PATENT DOCUMENTS

| | | | |
|---|---|---|---|
| 5,187,733 A * | 2/1993 | Beffel et al. | 379/9.06 |
| 5,479,473 A * | 12/1995 | Zey | 379/18 |
| 5,764,727 A * | 6/1998 | Toumani et al. | 379/29.04 |
| 5,845,265 A | 12/1998 | Woolston | |
| 5,916,302 A | 6/1999 | Dunn et al. | |
| 5,944,824 A | 8/1999 | He | |
| 6,151,628 A | 11/2000 | Xu et al. | |
| 6,493,425 B1 * | 12/2002 | Abe | 379/1.01 |
| 6,678,826 B1 | 1/2004 | Kelly et al. | |
| 6,980,725 B1 * | 12/2005 | Swieconek | 385/135 |
| 7,640,581 B1 | 12/2009 | Brenton et al. | |
| 2001/0024446 A1 | 9/2001 | Craig et al. | |
| 2002/0118671 A1 | 8/2002 | Staples et al. | |
| 2003/0018916 A1 | 1/2003 | Smith et al. | |
| 2003/0219008 A1 | 11/2003 | Hrastar | |
| 2010/0110894 A1 * | 5/2010 | Smith | 370/241 |

OTHER PUBLICATIONS

Non-Final Rejection date mailed Mar. 30, 2007 in U.S. Appl. No. 10/789,292.
Response filed Jul. 2, 2007 to Non-Final Rejection date mailed Mar. 30, 2007 in U.S. Appl. No. 10/789,292.
Final Rejection date mailed Aug. 31, 2007 in U.S. Appl. No. 10/789,292.
RCE/Amendment filed Nov. 26, 2007 in U.S. Appl. No. 10/789,292.
Non-Final Rejection date mailed Jan. 8, 2008 in U.S. Appl. No. 10/789,292.
Response filed Apr. 11, 2008 to Non-Final Rejection dated Jan. 8, 2008 in U.S. Appl. No. 10/789,292.
Final Rejection date mailed Jul. 23, 2008 in U.S. Appl. No. 10/789,292.
RCE/Amendment filed Oct. 22, 2008 in U.S. Appl. No. 10/789,292.

(Continued)

*Primary Examiner* — Alexander Jamal
(74) *Attorney, Agent, or Firm* — Swanson & Bratschun, L.L.C.

(57) ABSTRACT

A system and method for testing a subscriber loop. A maintenance port of a switch is configured to dial a phone number associated with a subscriber loop. A remote device is commanded to initiate a test for the subscriber loop utilizing a test bus. Test measurements of the subscriber loop are received from a remote test head.

14 Claims, 4 Drawing Sheets

(56) References Cited

OTHER PUBLICATIONS

Non-Final Rejection date mailed Dec. 16, 2008 in U.S. Appl. No. 10/789,292.
Response filed Mar. 16, 2009 to Non-Final Rejection dated Dec. 16, 2008 in U.S. Appl. No. 10/789,292.
Final Rejection date mailed Apr. 9, 2009 in U.S. Appl. No. 10/789,292.
Response filed Apr. 9, 2009 to Final Rejection dated Apr. 9, 2009 in U.S. Appl. No. 10/789,292.
Advisory Action date mailed Jun. 3, 2009 in U.S. Appl. No. 10/789,292.
Examiner Interview Summary date mailed Jul. 16, 2009 in U.S. Appl. No. 10/789,292.
RCE/Amendment filed Jul. 16, 2009 in U.S. Appl. No. 10/789,292.
Notice of Allowance/Allowability date mailed Aug. 24, 2009 in U.S. Appl. No. 10/789,292.
U.S. Appl. No. 10/789,292; Issue Notification dated Dec. 9, 2009; 1 page.

* cited by examiner

United States Patent US 8,750,460 B2

SYSTEM AND METHOD FOR REMOTE TESTING OF A SUBSCRIBER LOOP

BACKGROUND OF THE INVENTION

Description of the Related Art

The use of and development of communications has grown nearly exponentially in recent years. The growth is fueled by larger networks with more reliable protocols and better communications hardware available to service providers and consumers. In order to maintain, add, and renovate existing lines, effective testing and verification processes and hardware need to be utilized. Test loops are often used to test a particular line or service. Setting up a test loop remotely may be a complex process. In addition, existing testing solutions may require the usage and coordination of multiple test heads and other testing equipment. Test equipment, and particularly test heads, are extremely expensive in terms of purchase and opportunity/time costs.

In order to test a subscriber loop two test heads may be required, in addition a test head connected to a switch may be required to interrupt important functionality testing to initiate the testing process from the switch. For example, a test head at the host office may receive a command from a test operating system, the test may then dials a phone number to be tested into the number test trunk (NTT) of the switch so that measurements may be taken by a remote test head for the selected subscriber loop. It is hard to estimate the overall costs of using multiple test heads, other hardware, and the employee/device hours required by traditional forms of loop testing.

BRIEF SUMMARY OF THE INVENTION

One embodiment provides a system and method for testing a subscriber loop. A maintenance port of a switch is configured to dial a phone number associated with a subscriber loop. A remote device is commanded to initiate a test for the subscriber loop utilizing a test bus. Test measurements of the subscriber loop are received from a remote test head.

Another embodiment provides a telecommunications system for testing a subscriber loop. The system may include a testing platform executing a testing operating system for interfacing with a user through a test client. The system may also include a switch in communication with the testing platform through a maintenance port of the switch. The maintenance port may be configured to receive a phone number to be tested. The system may also include a remote device in communication with the switch. The remote device may be configured to provide test bus access for the subscriber loop. The system may also include a test head in communication with the test bus of the remote device. The test head may be in communication with the network device. The test head may be configured to receive test measurements of the subscriber loop for communication to the testing platform.

Yet another embodiment provides a network device for testing a subscriber loop. The network device may include a processor for executing a test operating system and a memory for storing the test operating system. The test operating system may include a set of instructions operable when executed by the processor to instruct a maintenance port of a switch to dial a phone number associated with a subscriber loop, command a remote device to initiate a test for the subscriber loop utilizing a test bus, and receive test measurements of the subscriber loop from a remote test head.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

The illustrative embodiments provide a system and method for testing a local loop. The local loop may be tested by utilizing a specially configured test operating system (OS) to load a phone number or digits into a maintenance administrative port (MAP) of a switch. As a result, tests of a subscriber loop may be performed using a single test head, rather than multiple test heads conserving costly resources and streamlining the testing process.

Figure 1:
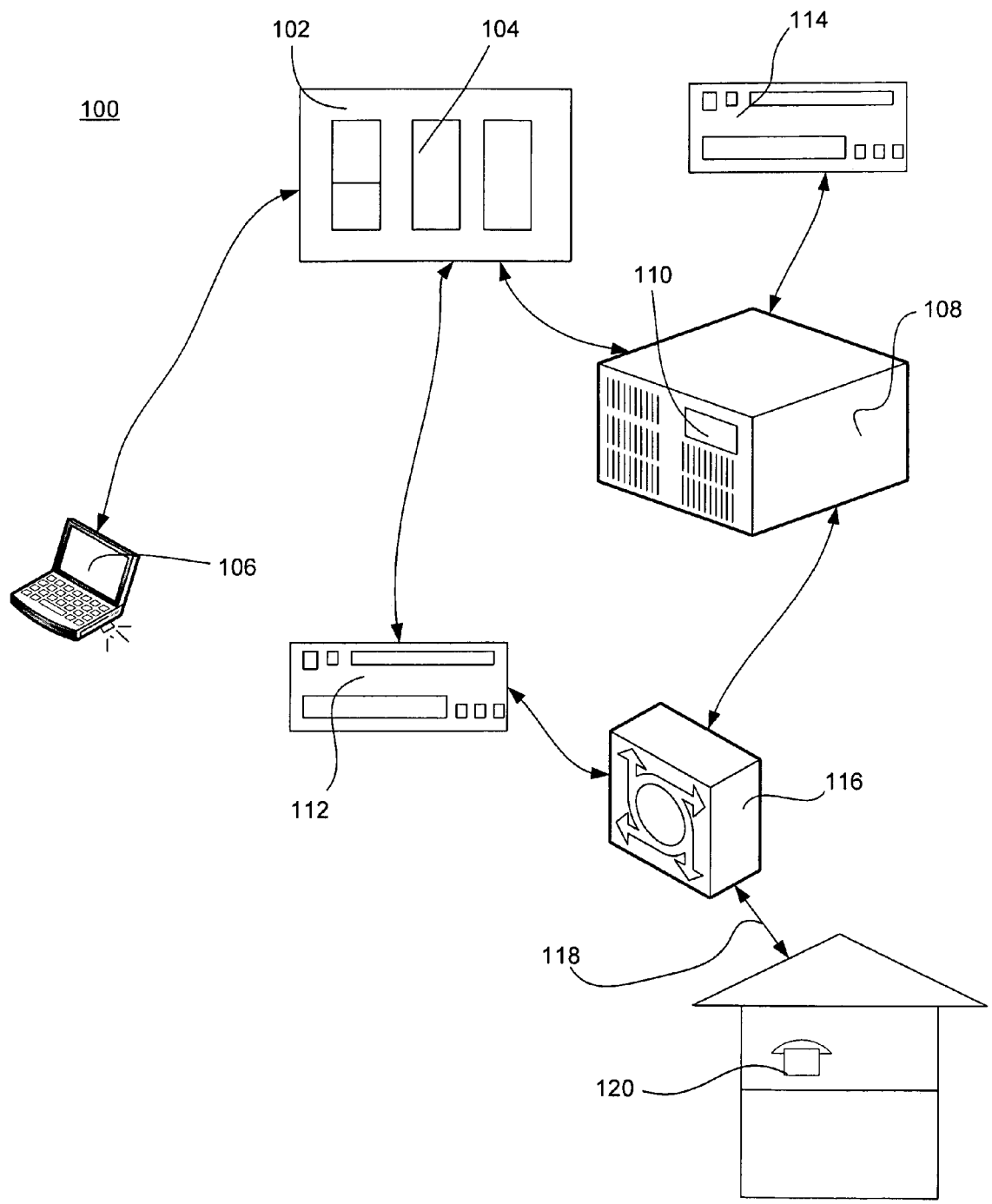
FIG. 1 is a pictorial representation of a testing system in accordance with an illustrative embodiment.

FIG. 1 is a pictorial representation of a testing system in accordance with an illustrative embodiment. The testing system 100 may include various communications elements, devices, and components that are not necessarily described or shown in the illustrative embodiments. In one embodiment, the testing system 100 may include a communications management system 102, a test operating system 104, a test client 106, a switch 108, a maintenance port 110, test heads 112 and 114, a remote device 116, a subscriber loop 118, and a subscriber 120.

In one embodiment, the test client 106 is a computing device utilized to initiate and control testing of the subscriber loop 118. In another embodiment, the test client 106 may represent a user in combination with a test device that may be utilized for testing lines and connections to a customer's premises. In another embodiment, the test client 106, as shown, may be an automated application, or other element for initiating testing. For example, the test client 106 may be a desktop computer operated by a network analyst at a network monitoring center of a communications service provider.

The testing may be initiated based on a standard procedure, installation, complaint, trouble ticket, automated testing system, or based on other needs and circumstances. In particular, the testing may be performed to measure the current metallic or conducting properties of a copper line, such as capacitance, faults, direct current, alternating current, noise, loss, and attenuation. In another embodiment, the testing may also be for other non-metallic transmission mediums, lines, or connections.

The communications management system 102 is one or more telecommunications devices configured to manage a communications network. The communications management system 102 may include any number of servers, switches, platforms, systems routers, as well as various programs, architectures, applications, programs, and modules suitable for controlling and managing elements in the testing system 100. In one embodiment, the communications management system 102 is a platform that executes the test operating system 104. The test operating system 104 is software that manages testing resources in a communications network and provides users an interface utilized to access the testing resources. The test operating system 104 may provide an interface that allows a user accessing the test client 106 to send and receive data and information for testing the subscriber loop 118 and viewing test results and measurements. The test operating system 104 may be configured with a module, application, or set of instructions that enable it to communicate with the maintenance port 110 of the switch. In one embodiment, the test operating system 104 is a product, such as Nortel Access Care, TollGrade Loop Care, or other similar operating systems designed for testing network components and the subscriber loop 118.

The switch 108 is a system of electronic components, circuits, software, and other elements that provides local service, and connects, routes, and manages telephone calls for a publicly switched telephone network (PSTN). The switch 108 may be a host voice switch utilized to service the subscriber 120. For example, the switch 108 may be a Nortel DMS series or a Lucent 5E category switch. In another embodiment, the switch 108 may also perform the same services and features for voice over Internet Protocol communications.

The maintenance port 110 is a multilevel menu system for administering and entering commands for hardware and maintenance. The different elements of the testing system 100 may communicate using any number of languages, signals, or protocols. In one embodiment, the testing system 100 communicates using transaction language 1 (TL1), a widely used telecommunication management protocol. However, the testing system 100 may communicate using SS7, Internet Protocol, or other signaling formats and protocols. The maintenance port 110 may interact with internal modules of the switch 108 to look up information and data regarding the subscriber loop 118. For example, the maintenance port 110 may use references tables to determine where the number for the subscriber loop resides, which may include another series of tables. The maintenance port 110 sets up the call path for enabling the remote device 116 to test the subscriber loop 118. The table name and configuration may be different based on the brand, configuration, or type of switch utilized. The maintenance port 110 may send an acknowledgement to the test operating system 104 indicating that the test operating system 104 may instruct the test head 112 to take measurements of the testing performed on the subscriber loop 118.

The remote device 116 is a telecommunications device that extends communications from the switch 108 to the subscriber 120. The remote device 116 may set up subscriber loops that may be measured by the co-located test head 112. In one embodiment, the remote device 116 is a digital loop carrier (DLC), such as an AFC UMC 1000, Marconi DISC*S, or other GR-303 driven device with a test bus. GR-303 is a set of criteria and parameters for enabling multiple distribution technologies and architectures for network providers. However, the remote device 116 may be any remote device including a test bus or testing equipment for testing the subscriber loop 118. The availability of the test bus indicates that the remote device has built-in test access.

The test head 112 is a device configured to test the subscriber loop 118 and services provided to the subscriber 120. The test head 112 may be a device, such as a TollGrade DigiTest, DigiTest Edge, Nortel CALRS RTU, Consultronics Cable Shark, or other device or product suitable for testing subscriber loops and services. The test head 112 may take test measurements for the subscriber loop 118 when set-up for testing by the remote device 116. The test measurements may include testing the communications properties of the subscriber loop. For example, the test head 112 may test the capacitance, attenuation, AC, DC, faults, shorts, resistance, and other metallic or line tests of the subscriber line 118 in order to determine how the subscriber's devices or services are affected. The test head 114 may be similar or identical to the test head 112. The illustrative embodiments may allow the subscriber loop 118 to be set-up for testing and tested without requiring interaction with the test head 114. As a result, the test head 114 may be utilized for more imperative system level testing or eliminated altogether.

Figure 2:
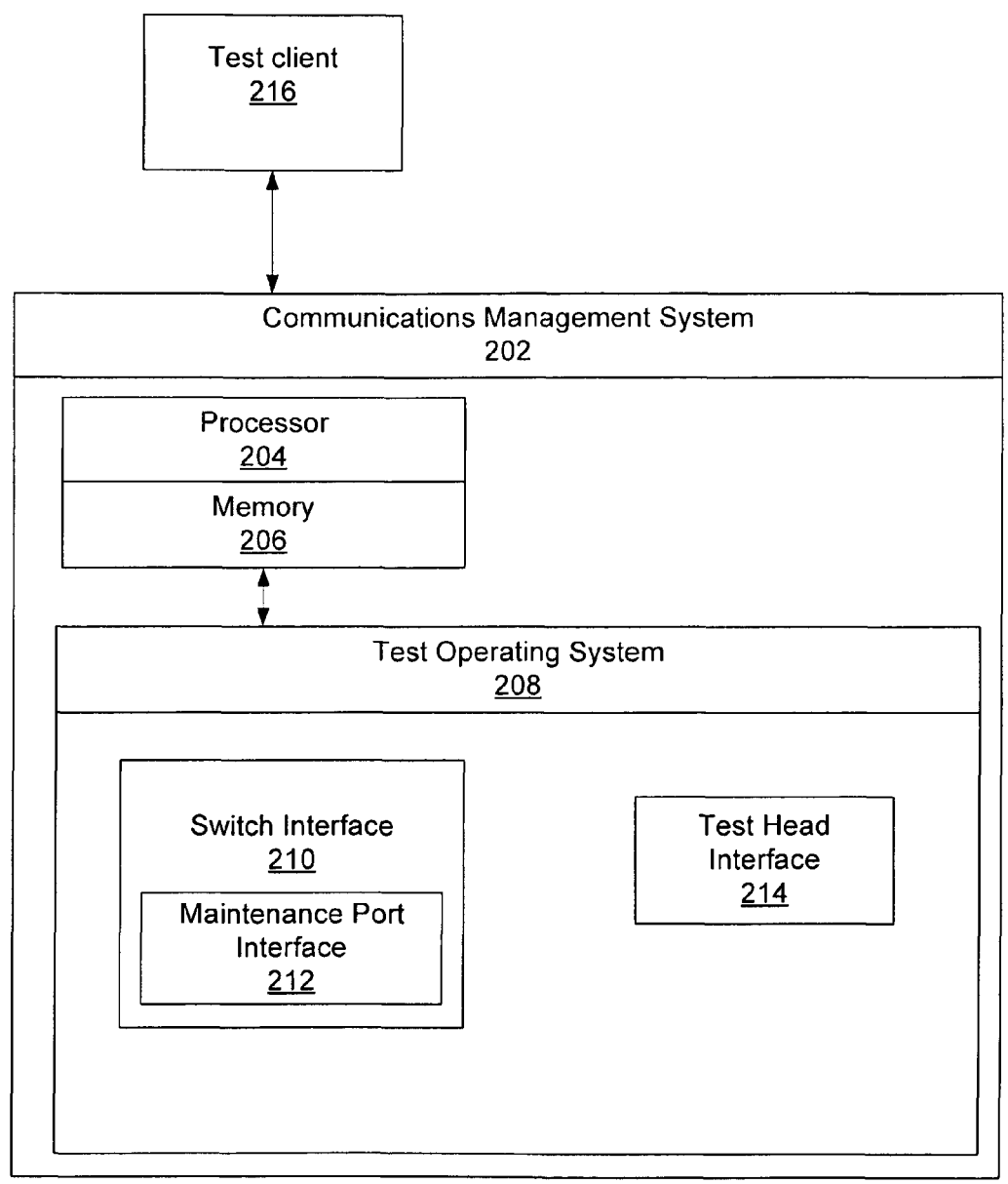
FIG. 2 is a block diagram of a communications management system in accordance with an illustrative embodiment.

FIG. 2 is a block diagram of a communications management system in accordance with an illustrative embodiment. The communications management system 202 is a particular implementation of the communications management system 102 of FIG. 1. In one embodiment, the communications management system 202 is an intelligent network device including a processor 204, memory 206, test operating system 208, switch interface 210, maintenance port interface 212, and test head interface 214.

The communications management system 202 may be one or more network devices and systems including servers, routers, platforms, switches and other intelligent devices. In one embodiment, the communications management system 202 may include a web server enabling a test client 216 to access and control testing performed by the test operating system 208. The test client 216 is a device, application, or platform for sending and receiving user input to the communications management system 202 and the test operating system 208.

The processor 204 is circuitry or logic enabled to control execution of a set of instructions. The processor 204 may be a microprocessor, digital signal processor, central processing unit, or other device suitable for controlling an electronic device including one or more hardware and software elements, executing software, instructions, programs and applications, converting and processing signals and information, and performing other related tasks. The processor 204 may be a single chip or integrated with other computing or communications elements.

The memory 206 is a hardware element, device, or recording media configured to store data for subsequent retrieval or access at a later time. The memory 206 may be static or dynamic memory. The memory 206 may include a hard disk, random access memory, cache, removable media drive, mass storage, or configuration suitable as storage for data, instructions, and information. In one embodiment, the memory 206 and processor 204 may be integrated. The memory may use any type of volatile or non-volatile storage techniques and mediums. In one embodiment, the test operating system 208 may be stored in the memory 206 for access and execution.

In addition to the standard features of the test operating system 208, the test operating system 208 may also include the switch interface 210 and the maintenance port interface 212. The switch interface 210 and maintenance port interface 212 may communicate with a switch to set up a subscriber loop in the remote device for testing. In one embodiment, the maintenance port interface 212 may open a connection with the maintenance port of the switch for sending commands and receiving confirmations. In particular, the maintenance port interface 212 may command a remote device to place a specific subscriber loop on its test bus in order to allow the remote test head access to that particular subscribers loop. The switch interface 210 and the maintenance port interface 212 may be applications or modules within the test operating system 208 configured for interaction with a host voice switch, test heads, or other network devices or software constructs.

Figure 3:
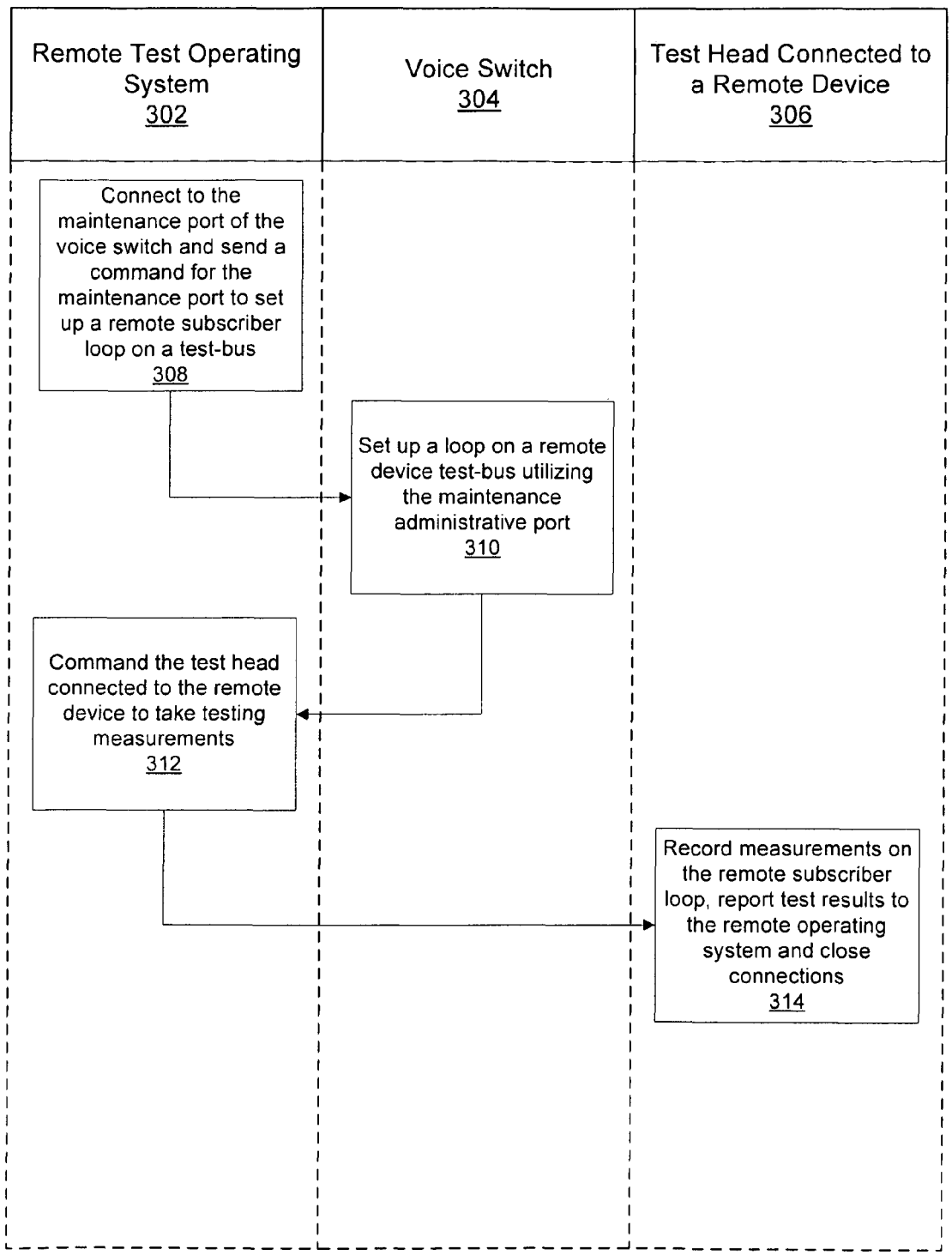
FIG. 3 is a flowchart of a process for testing a subscriber loop utilizing a testing system in accordance with an illustrative embodiment.

FIG. 3 is a flowchart of a process for testing a subscriber loop utilizing a testing system in accordance with an illustrative embodiment. The process of FIG. 3 may be implemented by a remote test operating system 302, a voice switch 304, and a test head 306 connected to a remote device. The process may begin with the remote test operating system 302 connecting to the voice switch maintenance port and sending a command for the maintenance port to set up a remote subscriber loop on a test bus (step 308). The maintenance port of the voice switch 304 may be open for communication with the remote test operating system 302 at any time communications are transmitted or otherwise initiated. A maintenance port or voice switch module of the remote test operating system 302 may be configured to interface with the maintenance port to send commands, receive feedback, and otherwise communicate. The test bus is the test equipment or features of a remote device configured for testing the subscriber loop. The test bus may include multi-meters, time domain reflectometers, and other instruments for measuring resistance, attenuation, propagation delay, delay skew, cable length, insertion loss, wiremap, return loss, crosstalk, faults, conductivity, connectivity, or any other suitable performance measure or characteristics in pass/fail terms as well as exact measurements.

Next, the voice switch 304 sets up a loop on a remote device test bus utilizing the maintenance administrative port (step 310). The set up of the test bus may include configuring a number of tests for the subscriber loop which may test the communications properties, transmission speeds, and other relevant characteristics of the subscriber loop as installed and configured. The maintenance port of the voice switch 304 may send an acknowledgment message when the testing is configured, scheduled, or otherwise programmed at the remote device.

Next, the remote test operating system 302 commands the test head connected to the remote device to take testing measurements (step 312). The test head 306 may record the test measurements as the subscriber loop is tested by the remote device. The test measurements may include any number of measurements that indicate problems, capacity, thresholds, limitations, faults, or other relevant information about the subscriber loop.

The process may end with the test head 306 recording measurements on the remote subscriber loop, reporting test results to the remote operating system, and closing connections (step 314).

Figure 4:
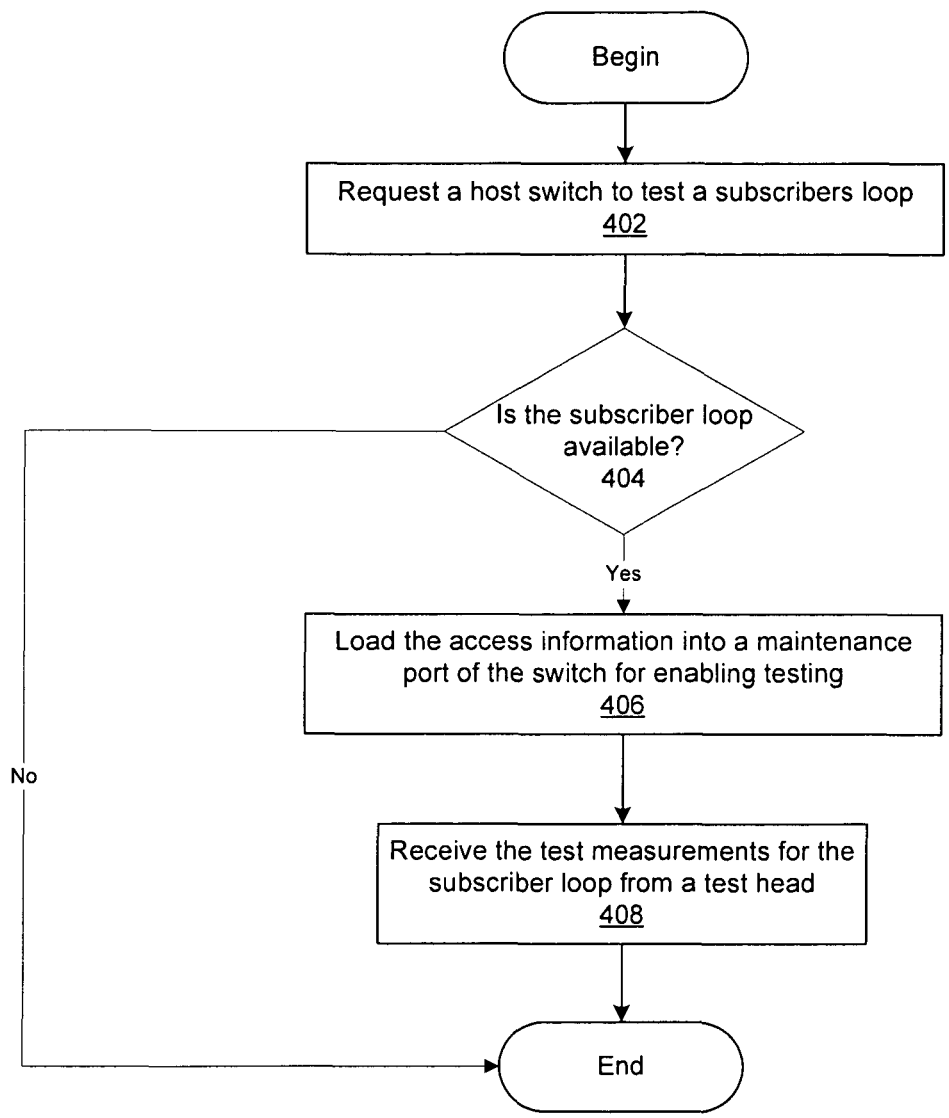
FIG. 4 is a flowchart of a process for testing a subscriber loop in accordance with an illustrative embodiment.

FIG. 4 is a flowchart of a process for testing a subscriber loop in accordance with an illustrative embodiment. The process of FIG. 4 may be implemented by a network device executing a test operating system. The process may begin by requesting a host switch test a subscriber loop (step 402). The request may be initiated based on a manual selection by a user or an automated request. In one embodiment, the request may be received from a test client.

Next, the test operating system determines whether the subscriber loop is available (step 404). The determination of step 404 may be made based on a test or verification performed by the host switch. In one embodiment, the determination is made based on whether communications are ongoing or the subscriber loop is otherwise busy or unavailable. For example, a subscriber loop, line, or connectivity test may not be performed while a voice communication is ongoing. If the subscriber loop is unavailable in step 404, the process terminates. Steps 402 and 404 may be performed again based on a pre-set time period or retry period for ensuring that the subscriber loop test occurs as soon as possible.

If the subscriber loop is available in step 404, the test operating system loads the access information in a maintenance port of the host switch for enabling testing (step 406). The access information may include the phone number, identifier, or other information that points to or designates the subscriber loop. The test operating system may include an interface that allows interaction with the maintenance port. The access information may include a command for the maintenance port to set up a subscriber loop on a remote device test bus.

Next, the test operating system receives the test measurements for the subscriber loop from a test head (step 408). The test measurements provide information regarding the subscriber loop. In particular, the test measurements may be utilized to determine whether the customer is receiving services at designated thresholds.

The illustrative embodiments simplifies and speeds the testing process by communicating from the test operating system directly to the host switch MAP port rather than a host positioned test head and the NTT of the host switch. The illustrative embodiments may eliminate the need for a test head at the host switch location to perform a split-bus test, thereby reducing cost, reducing another possible failure point, and improving speed and functionality. Any number of corrective actions may be taken based on the test measurements. For example, additional tests, analysis, or diagnosis may be requested or performed. In addition, a network technician may be dispatched to troubleshoot and fix the subscriber loop. Based on the test measurements additional tests may be performed The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A method for testing a subscriber loop, the method comprising:
   providing a test head at a digital loop carrier;
   providing a communications management system including a test operating system;
   connecting, through the test head and through the communications management system, the digital loop carrier to a maintenance port of a switch;
   loading, from the test operating system, access information in the maintenance port;
   configuring the maintenance port to dial a phone number associated with a subscriber loop, wherein dialing the phone number associated with the subscriber loop causes a call path to be set up between the digital loop carrier and the subscriber loop for testing the subscriber loop;
   commanding, with a test client communicating with the test operating system, the digital loop carrier to initiate a test of the subscriber loop utilizing a test bus;
   receiving test measurements of the subscriber loop from the test head co-located with the digital loop carrier;
   determining if the subscriber loop is available for testing; and
   if the subscriber loop is unavailable for testing, configuring the maintenance port to dial the phone number associated with the subscriber loop again within a preset time period to set up the call path between the digital loop carrier and the subscriber loop.

2. The method of claim 1, wherein the configuring, commanding, and receiving are performed by the test operating system executed by the communications management system.

3. The method of claim 2, wherein the test operating system is controlled by a user communicating with the test operating system through a test client.

4. The method of claim 2, wherein the test operating system is configured to load the phone number into the maintenance port of the switch.

5. The method of claim 1, wherein the commanding step is performed in response to determining the subscriber loop is available for testing.

6. The method of claim 1, wherein the test head at the digital loop carrier is not connected to the switch to dial in numbers associated with the subscriber loop for testing at the digital loop carrier.

7. The method according to claim 2, wherein the test operating system communicates with the switch through a switch interface, and wherein the test operating system communicates with the test head through a test head interface.

8. A telecommunications system for testing a subscriber loop, the telecommunications system comprising:
   a test head at a digital loop carrier;
   a communications management system including a test operating system;
   a maintenance port of a switch, connected through the test head and through the communications management system to the digital loop carrier wherein;
      access information is loaded from the test operating system to the maintenance port;
      the maintenance port is configured to dial a phone number associated with a subscriber loop, wherein dialing the phone number associated with the subscriber loop causes a call path to be set up between the digital loop carrier and the subscriber loop for testing the subscriber loop;
   a test client communicating with the test operating system commands the digital loop carrier to initiate a test of the subscriber loop utilizing a test bus; wherein
   test measurements of the subscriber loop are received from the test head co-located with the digital loop carrier;
   determine whether the subscriber loop is available for testing; and
   if the subscriber loop is unavailable for testing, the maintenance port is configured to dial the phone number associated with the subscriber loop again within a preset time period to set up the call path between the digital loop carrier and the subscriber loop.

9. The telecommunications system according to claim 8, wherein the test client receives test measurements indicating the performance of the subscriber loop for taking a corrective action.

10. The telecommunications system according to claim 8, wherein the switch initiates testing at the digital loop carrier once the subscriber loop is available.

11. A communications management system for testing a subscriber loop comprising:
   a processor for executing a test operating system, the test operating system including a set of instructions; and
   a non-transitory memory for storing the set of instructions, wherein the set of instructions are operable when executed by the processor to:
      load, from the test operating system, access information to a maintenance port of a switch;
      configure the maintenance port to dial a phone number associated with a subscriber loop, wherein dialing the phone number associated with the subscriber loop causes a call path to be set up between the digital loop carrier and the subscriber loop for testing the subscriber loop;
      command, with a test client communicating with the test operating system, the digital loop carrier to initiate a test of the subscriber loop utilizing a test bus;
      receive test measurements of the subscriber loop from a test head co-located with the digital loop carrier;
      determine whether the subscriber loop is available for testing before initiating testing; and
      if the subscriber loop is unavailable for testing, configure the maintenance port to dial the phone number associated with the subscriber loop again within a preset time period to set up the call path between the digital loop carrier and the subscriber loop.

12. The communications management system according to claim 11, wherein the test operating system loads the digits of the phone number into the maintenance port for testing.

13. The communications management system according to claim 11, wherein the test operating system communicates with the switch to determine whether the subscriber loop is available before initiating testing.

14. The communications management system according to claim 11, wherein the test operating system communicates with the switch through a maintenance port interface, and wherein the test operating system communicates with the test head through a test head interface.

* * * * *